United States Patent
Stadlen et al.

(10) Patent No.: US 9,268,464 B1
(45) Date of Patent: Feb. 23, 2016

(54) LINK DETERMINATION AND USAGE USING IMAGE RECOGNITION

(75) Inventors: Andrew Stadlen, Mountain View, CA (US); Gerry Pesavento, Davis, CA (US); Pierre Garrigues, San Francisco, CA (US); Huy X. Nguyen, Berkeley, CA (US); Benjamin Jackson Culpepper, Berkeley, CA (US); David Warland, Davis, CA (US)

(73) Assignee: Yahoo! Inc., Sunnyvale, CA (US)

( * ) Notice: Subject to any disclaimer, the term of this patent is extended or adjusted under 35 U.S.C. 154(b) by 7 days.

(21) Appl. No.: 13/563,637

(22) Filed: Jul. 31, 2012

Related U.S. Application Data (60) Provisional application No. 61/561,214, filed on Nov. 17, 2011.

(51) Int. Cl.
 *G06K 9/46* (2006.01)
 *G06K 9/66* (2006.01)
 *G06F 3/0482* (2013.01)
 *G06F 17/30* (2006.01)

(52) U.S. Cl.
 CPC ........ *G06F 3/0482* (2013.01); *G06F 17/30259* (2013.01)

(58) Field of Classification Search
 CPC ..................... G06F 17/30244; G06K 9/00671; G06K 9/00684
 USPC .......................................... 382/106, 195, 232
 See application file for complete search history.

(56) References Cited

U.S. PATENT DOCUMENTS

| | | | | |
|---|---|---|---|---|
| 7,860,946 B1* | 12/2010 | Bulleit et al. | ................. | 709/218 |
| 8,155,387 B2* | 4/2012 | Arnaud et al. | ................. | 382/106 |
| 8,356,247 B2* | 1/2013 | Krassner et al. | ............. | 715/234 |
| 8,807,421 B2* | 8/2014 | Johnson | ........................ | 235/375 |
| 2002/0049781 A1* | 4/2002 | Bengtson | ............ | G06F 17/3089 715/205 |
| 2008/0254778 A1* | 10/2008 | Kim | ...................... | G06F 3/0482 455/414.3 |
| 2009/0216549 A1* | 8/2009 | Causey et al. | ..................... | 705/1 |
| 2010/0293202 A1* | 11/2010 | Kim et al. | ..................... | 707/803 |
| 2011/0035594 A1* | 2/2011 | Fox | ........................ | G06Q 30/06 713/170 |
| 2012/0046985 A1* | 2/2012 | Richter | .................. | G06Q 10/06 705/7.14 |
| 2012/0143760 A1* | 6/2012 | Abulafia et al. | ................. | 705/44 |
| 2012/0238254 A1* | 9/2012 | Yankovich et al. | ........ | 455/414.2 |
| 2012/0317595 A1* | 12/2012 | Hong | .............................. | 725/23 |
| 2013/0071037 A1* | 3/2013 | Isaacs | ........................... | 382/232 |

\* cited by examiner

*Primary Examiner* — Gregory M Desire
(74) *Attorney, Agent, or Firm* — Weaver Austin Villeneuve & Sampson LLP (57) ABSTRACT

A system for link acquisition and usage using image recognition comprises an interface, a processor, and a memory. The interface is for receiving an image. The processor is configured to: determine one or more tags for the image; determine one or more links associated with the one or more tags; and cause an action associated with a selected link of the one or more links. The memory is coupled to the processor and is configured to provide the processor with instructions.

30 Claims, 10 Drawing Sheets

LINK DETERMINATION AND USAGE USING IMAGE RECOGNITION

CROSS REFERENCE TO OTHER APPLICATIONS

This application claims priority to U.S. Provisional Patent Application No. 61/561,214 entitled MEDIA AND APP STORE SEARCH AND CONTENT DISCOVERY USING IMAGE RECOGNITION filed Nov. 17, 2011 which is incorporated herein by reference for all purposes.

BACKGROUND OF THE INVENTION

Typically, locating a specific item, content, or application is inefficient, error-prone, and requires multiple steps, generally including typing a search and choosing a result from a list, visiting an unfamiliar site, or sending a message to an unknown party and waiting an unspecified amount of time for a response. In some situations, a barcode and a barcode scanner can be used. However, barcodes/QR codes and barcode/QR scanners are not ubiquitous and generally must be understood and downloaded by the user; Also, barcodes and QR codes are frequently considered to be ugly and are avoided by marketing personnel who do not wish to print them on their collateral.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for link determination and usage using image recognition is disclosed. The system comprises an interface, a processor, and a memory. The interface is for receiving an image. The processor is configured to determine one or more tags for the image; determine one or more links associated with the one or more tags; and cause action associated with a selected link of the one or more links. The memory is coupled to the processor and configured to provide the processor with instructions.

In some embodiments, the system facilitates searching for item acquisition, application acquisition, information acquisition, and media content acquisition for a mobile device by using image recognition to identify tag(s) (e.g., a title, text tag, or label) of interest and to associate one or more links with the tag(s). For example, the search objective may include software applications; electronic books, magazines, or newspapers; advertisements, products, objects, musical albums or tracks; television shows or scenes or music videos; movies; audiobooks; and podcasts. The image recognition capability may be, but need not be, integrated into the standard camera application on a smartphone, tablet, laptop, or other mobile device. In some cases, a mobile device and/or a remote server perform the image recognition processing using one or more processors and store data associated with the processing using transitory or non-transitory memories (e.g., RAM, ROM, magnetic memories, etc.). Additional cues from device location and from user profiles or data stored in other applications or in device settings may be used to further refine the search results to help users rapidly identify the application or content of interest.

In some embodiments, the system described uses the icon, logo or cover—a unique and attractive visual signature for a content item—as the means of locating the content item or a set of information associated with the content item and as a means of enabling a user to purchase and/or download the item in a single step or to retrieve associated content. This makes the process easier for the user, more accurate (e.g., preventing user errors), faster, and generally more likely to result in the user's acquiring the content of interest.

In some embodiments, a user points a device with a camera (e.g., on a phone) at a scene with an item in it and the system provides a tag associated with the item in the scene. Sometimes the user takes a photo or marks/selects or a motion sensor or motion sensing algorithm selects (e.g., motion ceases, slows, hovers on an item, circles an item, etc.) a specific image. The tag is associated with the item using image recognition (e.g., a computer vision process, a crowd source process, etc.). One or more links is/are provided automatically to the user on a display of the device that is/are associated with the tag. The associated links are stored in a database that has tags stored with associated link(s). The user then selects one link from the links displayed. The device then causes an action associated with the link to automatically be performed. For example, the action associated with the link is for providing information to display to the user regarding the tag associated with the item, the action associated with the link is for purchasing the item associated with the tag (e.g., the physical item, the application, the game, the movie, the song, etc.), etc. In some cases, the automatic purchase is achieved with minimal user interaction—for example, the user is not required to enter one or more of the following as these item(s) are automatically retrieved from a database and provided during the purchase process: a user name, a user address, a user phone number, a user purchase payment information (e.g., credit card, account number, electronic authorization, card type, card number, card code, card expiration, etc.), a shipping address, a shipping method (e.g., ground, 3-day, 2-day, overnight, express, etc.). In various embodiments, a user preference is set to preload the user purchase information, the type of links desired, the order of links desired, the type of display for the links (e.g., one, many, list, hidden list, etc.), one tag per picture automatically associated, multiple tags per picture automatically associated, audio of tag provided (e.g., a spoken tag for blind use of system), audio list provided (e.g., for voice activated selection of list item), audio provided automatically for link information or purchase, or any other appropriate user preference.

In some embodiments, the device is continuously/automatically streaming images that are acquired from the camera. In this case, tags are continuously/automatically recognized and link(s) are automatically streamed to the display as well for the user to select or ignore. The device updates the display automatically dropping old/unselected links. In various embodiments, there are more than one item in an image and tags are associated with more than one item or each recognized item or a plurality of items considered important (e.g., centered in the image, recognized in the image, largest in the image, appearing in a number of sequential images, appearing in a number of sequential images in the center, having the same tag be associated over a number of sequential or nearly sequential images, etc.) and, in turn, links are automatically associated with the tags and provided to the user associated with the items (e.g., shown to be associated with the image item, as a menu or bubble or icon with a list of links associated that can be expanded or is expanded near the item in a display of the device, etc.). In some embodiments, the tags that are continuously/automatically recognized are continuously/automatically provided to a user in an audio format and are continuously associated with links that are also provided in an audio format to the user. In some embodiments, the tags are continuously/automatically recognized and provided to a user in audio format and are in turn automatically associated with information link(s) that provide a user with audio information regarding location (e.g., using recognition of landmarks, preloaded room/building information, etc.).

In some embodiments, tags recognized or links selected are stored in a log (e.g., useful for recalling desired items that are not purchased immediately but maybe later or for indicating to others that the items are desired).

Figure 1:
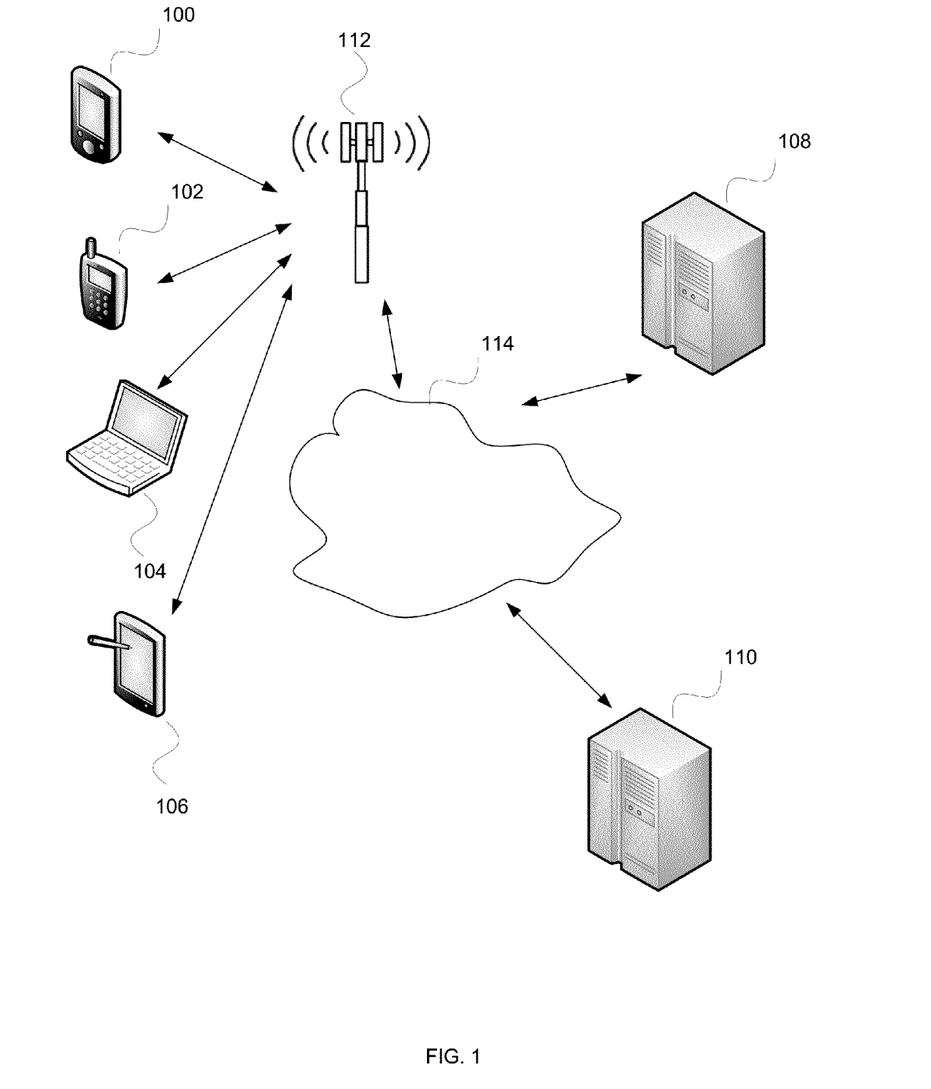
FIG. 1 is a diagram illustrating an embodiment of a system for link determination and usage using image recognition.

FIG. 1 is a diagram illustrating an embodiment of a system for link determination and usage using image recognition. In the example shown, a mobile device (e.g., smartphone 100, cell phone 102, laptop 104, tablet 106, smart glasses, etc.) includes an image device. The image device is able to capture an image. A user is able to capture an image or video containing something of interest—for example, a poster, a product box or container, an identifier (e.g., ISBN code, barcode, QR code, an icon, etc.), a book cover, a magazine cover, a newspaper, a landmark, a product, an everyday item (e.g., a dollar bill), etc. The image is processed locally on the mobile device and/or sent via networks (e.g., wireless network 112 and wired network 114—for example, a cell network and the Internet) to be processed using tag server 108 to identify tags. In some embodiments, tag server 108 and/or the mobile device perform computer or crowd recognition of the content of the image and associate one or more tags with the image. The text tags are used to determine associated links of the tags using link server 110. The link server, using stored associations between tags and links, returns different categories of links to the user of the mobile device. The user can then select a desired link and be directly able to start the application associated with the link. For example, content could be viewed directly using a web browser application and the link information, an item could be purchase using a purchasing page in a browser application and link information and/or purchasing information (e.g., credit card information, payment information, personal information, etc.), an application could be downloaded or launched using the link information, etc.

Figure 2:
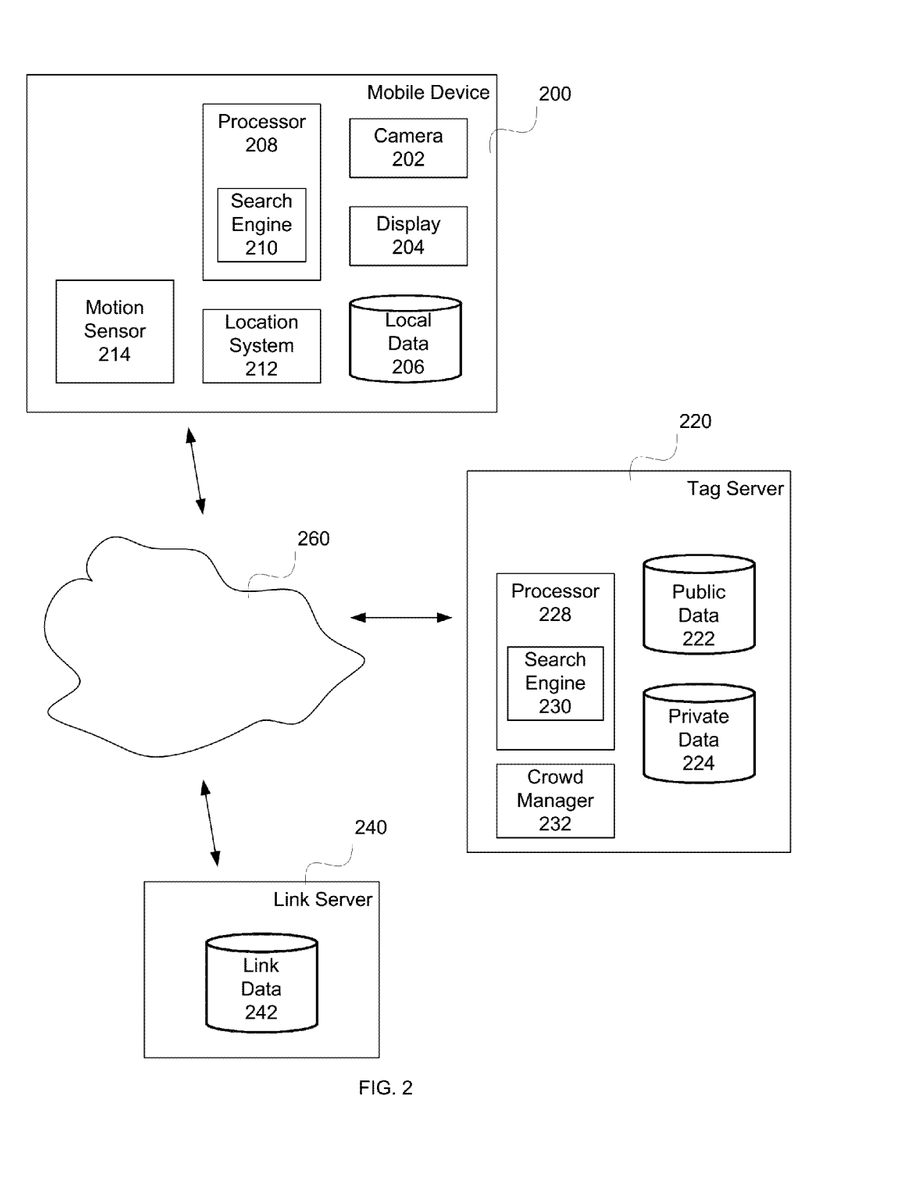
FIG. 2 is a diagram illustrating an embodiment for a system for link determination and usage using image recognition.

FIG. 2 is a diagram illustrating an embodiment for a system for link determination and usage using image recognition. In various embodiments, mobile device 200 is used to implement smartphone 100, cell phone 102, laptop 104, or tablet 106 of FIG. 1. In some embodiments, tag server 220 is used to implement tag server 108. In some embodiments, link server 240 is used to implement link server 110. In some embodiments the mobile device 200 is used to implement the recognition of tag(s). In the example shown, mobile device 200 comprises processor 208 (including search engine 210), camera 202, display 204, local data 206, location system 212, and motion sensor 214. A user of mobile device 200 takes a picture or video using camera 202 that the user is interested in. In various embodiments, the image or video is captured as triggered by the user, by the mobile device not moving about any more as measured using motion sensor 214, by being in a particular location as measured using location system 212, or by any other appropriate manner. In some cases, search engine 210 identifies a tag associated with an image. In some cases, tag server 220 receives the image and processes the image using processor 228/search engine 230 to identify one or more tags as stored in one or more databases (e.g., a public database or a private database associated with a user/company). Tag server 220 comprises public data 222, private data 224, processor 228 (including search engine 230), and crowd manager 232. Tag server 220 uses either computer recognition software and/or crowd recognition of the image. In some embodiments, computer recognition software learns from the crowd recognition of objects in the image. The one or more tags are then sent to link server 240 to identify associated links, which are provided and displayed to the user via display 204 so that the user can select a desired link. The user then is able launch applications to acquire items, acquire information, and/or acquire applications for mobile device 200.

In some embodiments, tag server 220 and link server 240 are the same server.

Figure 3:
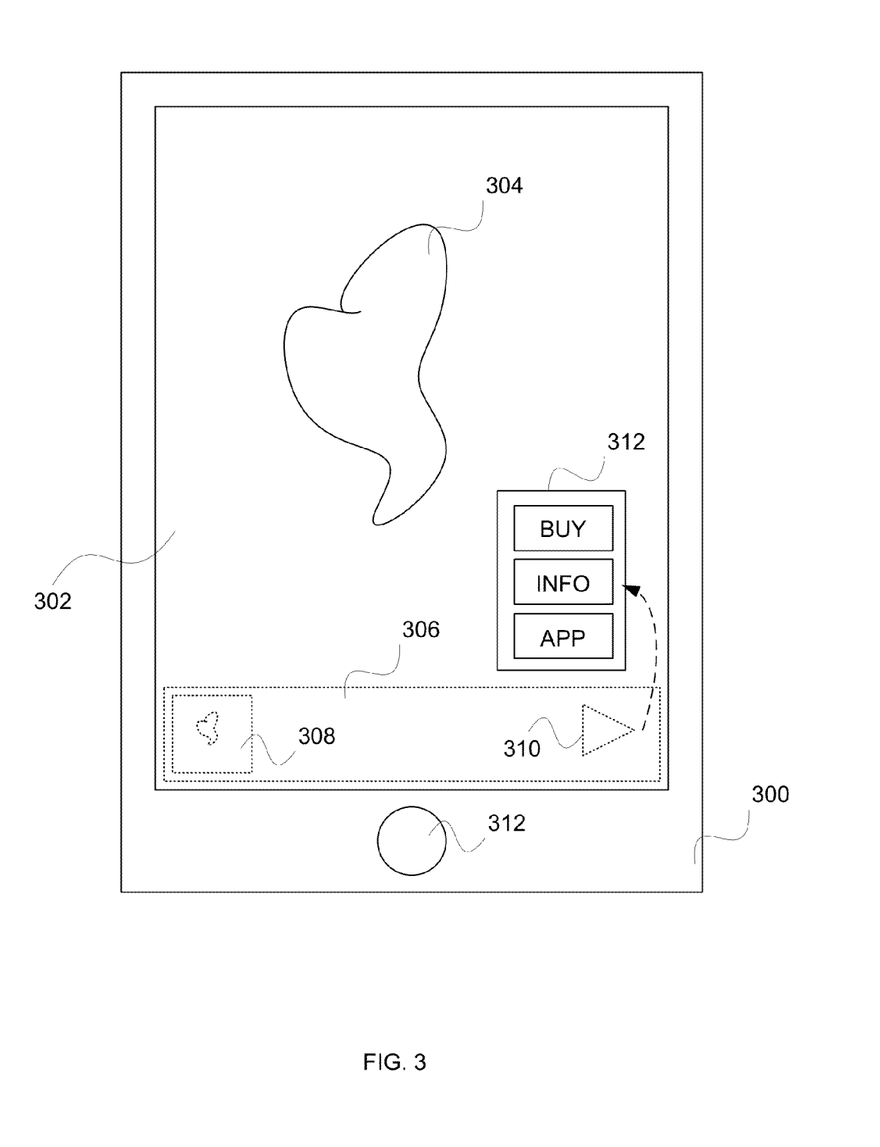
FIG. 3 is a diagram illustrating an embodiment of a mobile device in use for link determination and usage using image recognition.

FIG. 3 is a diagram illustrating an embodiment of a mobile device in use for link determination and usage using image recognition. In some embodiments, the mobile device of FIG. 3 is used to implement mobile device 200 of FIG. 2. In the example shown, mobile device 300 includes display 302 that is touch-sensitive to allow input by a user. Mobile device 300 also includes button 312 for enabling user input. Display 302 is shown depicting an image captured using a camera associated with mobile device 300 (e.g., a camera located on the rear of mobile device 300). Object 304 is part of the image captured. Object 304 has been processed to identify tags. From the tags, links are determined as indicated by the semi-transparent overlay bar 306 that includes semi-transparent tag identifier 308. Icon 310 indicates multiple associated links to tag associated with object 304. When bar 306 and/or icon 310 are selected by the user, sub-menu 312 listing associated links is displayed (e.g., 'BUY', 'INFO', 'APP', etc.). In some embodiments, in the event that a sub-menu item is selected, an application is launched associated with the link (e.g., a browser, a downloading application, a purchasing application, etc.). In some embodiments, in the event that an application is launched link information, tag information, and/or user information is sent to the application. In some embodiments, link information comprises an internet address. In various embodiments, user information comprises payment information, credit card information, billing address information, contact information, or any other appropriate information.

Figure 4:
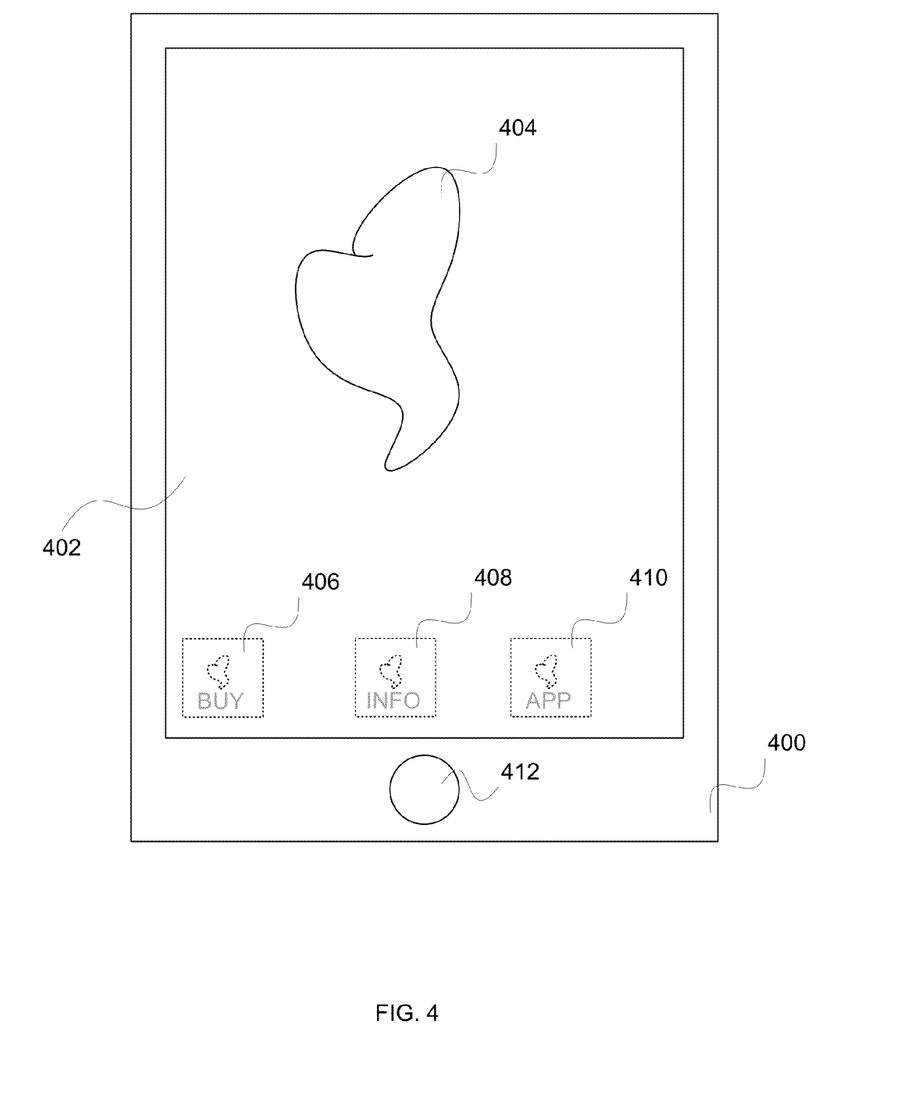
FIG. 4 is a diagram illustrating an embodiment of a mobile device in use for link determination and usage using image recognition.

FIG. 4 is a diagram illustrating an embodiment of a mobile device in use for link determination and usage using image recognition. In some embodiments, the mobile device of FIG. 4 is used to implement mobile device 200 of FIG. 2. In the example shown, mobile device 400 includes display 402 that is touch-sensitive to allow input by a user. Mobile device 400 also includes button 412 for enabling user input. Display 402 is shown depicting an image captured using a camera associated with mobile device 400 (e.g., a camera located on the rear of mobile device 400). Object 404 is part of the image captured. Object 404 has been processed to identify tags. From the tags, links are determined as indicated by the semi-transparent overlay icon 406, icon 408, and icon 410. When icon 406 (e.g., 'BUY'), icon 408 (e.g., 'INFO'), or icon 410 ('APP') is selected, an application is launched associated with the link (e.g., a browser, a downloading application, a purchasing application, etc.). In some embodiments, in the event that an application is launched link information, tag information, and/or user information is sent to the application. In some embodiments, link information comprises an internet address. In various embodiments, user information comprises payment information, credit card information, billing address information, contact information, or any other appropriate information.

In some embodiments, more than one object is identified using one or more tags and links associated with each object are determined. In some embodiments, the tags/links are displayed using semi-transparent labels or icons over or near the object within the image.

Figure 5:
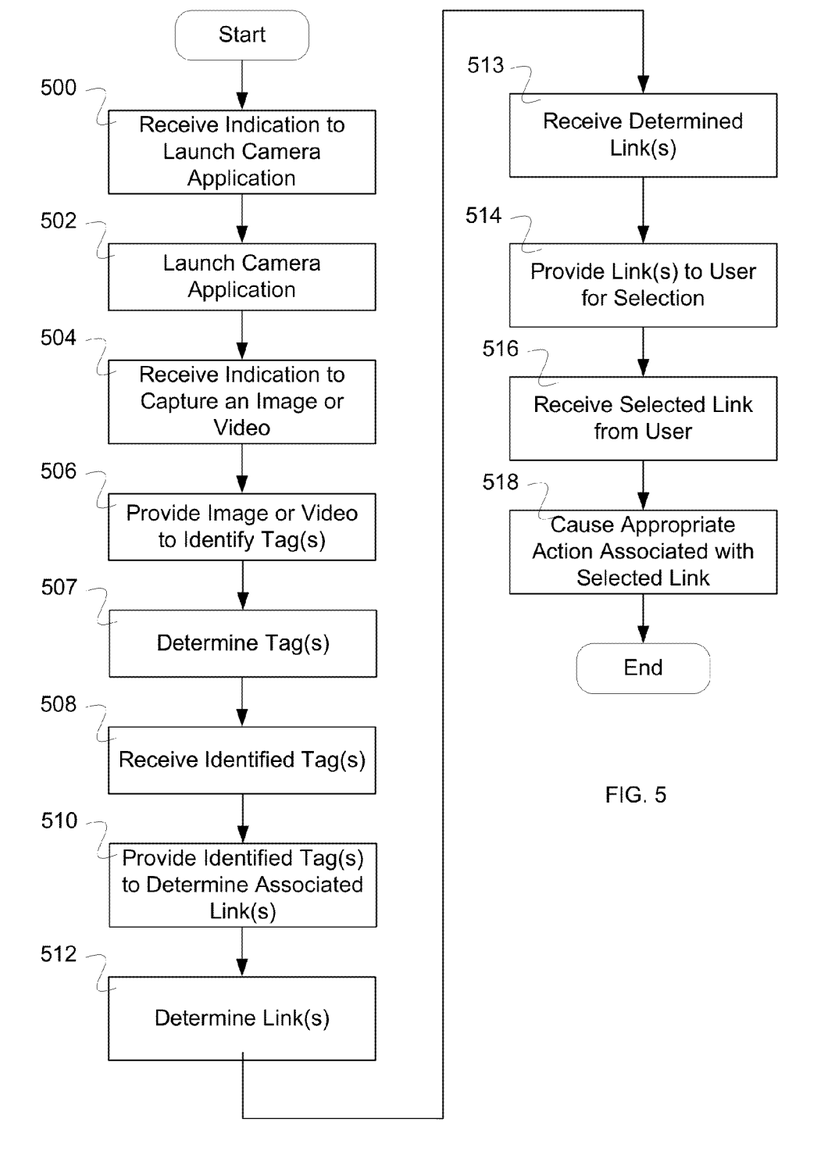
FIG. 5 is a flow chart illustrating an embodiment of a process for link determination and usage using image recognition.

FIG. 5 is a flow chart illustrating an embodiment of a process for link determination and usage using image recognition. In some embodiments, the process of FIG. 5 is implement using the system of FIG. 1 or FIG. 2. In the example shown, in 500 an indication is received to launch a camera application. In 502, the camera application is launched. In 504, an indication is received to capture an image or a video. For example, a button is pushed to take a picture or start a video stream. The picture or image or video stream is stored in a local memory. In 506, the image or the video is provided to identify tag(s). For example, data is sent to a processor locally on a mobile device or to a tag server to be processed. In 507, tag(s) is/are determined. For example, the processor uses computer vision or provides a crowd to identify tags associated with data. In 508, identified tag(s) is/are received. In 510, identified tag(s) is/are provided to determine associated link(s). In 512, link(s) is/are determined. For example, a link server searches a database of associated links and tags and provides matching links. In 513, determined link(s) is/are received. In 514, link(s) is/are provided to user for selection. In 516, a selected link is received from user. For example, a user selects desired link by touching an icon on a screen or selecting an entry in list or menu. In 518, appropriate action is caused to be associated with the selected link. For example, a program or application such as a web browser is launched and directed toward the provided link.

Figure 6:
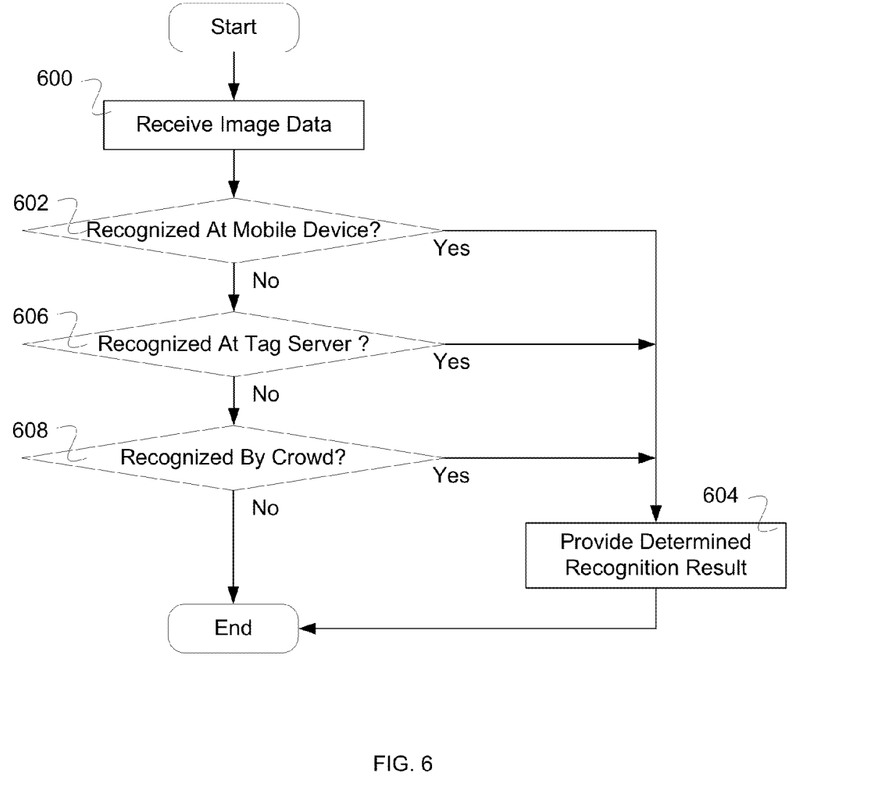
FIG. 6 is a flow diagram illustrating an embodiment of a process for serially identifying a tag.

FIG. 6 is a flow diagram illustrating an embodiment of a process for serially identifying a tag. In some embodiments, the process of FIG. 6 is used to implement 507 of FIG. 5. In the example shown, in 600 an image data is received. For example, a still image or a portion of a video stream is received at a processor for tag recognition. In some embodiments, the image is sent from a mobile device imaging device to a processor of the mobile device and the processor of a tag server. In 602, it is determined whether the image data is recognized at a mobile device. In the event that image data is recognized, control passes to 604. In the event that image data is not recognized control passes to 606. In 606, it is determined whether the image data is recognized at a tag server. In the event that image data is recognized, control passes to 604. In the event that image data is not recognized control passes to 608. In 606, it is determined whether the image data is recognized by the crowd. In the event that image data is recognized, control passes to 604. In the event that image data is not recognized, the process ends. In 604, the determined recognition result is provided.

Figure 7:
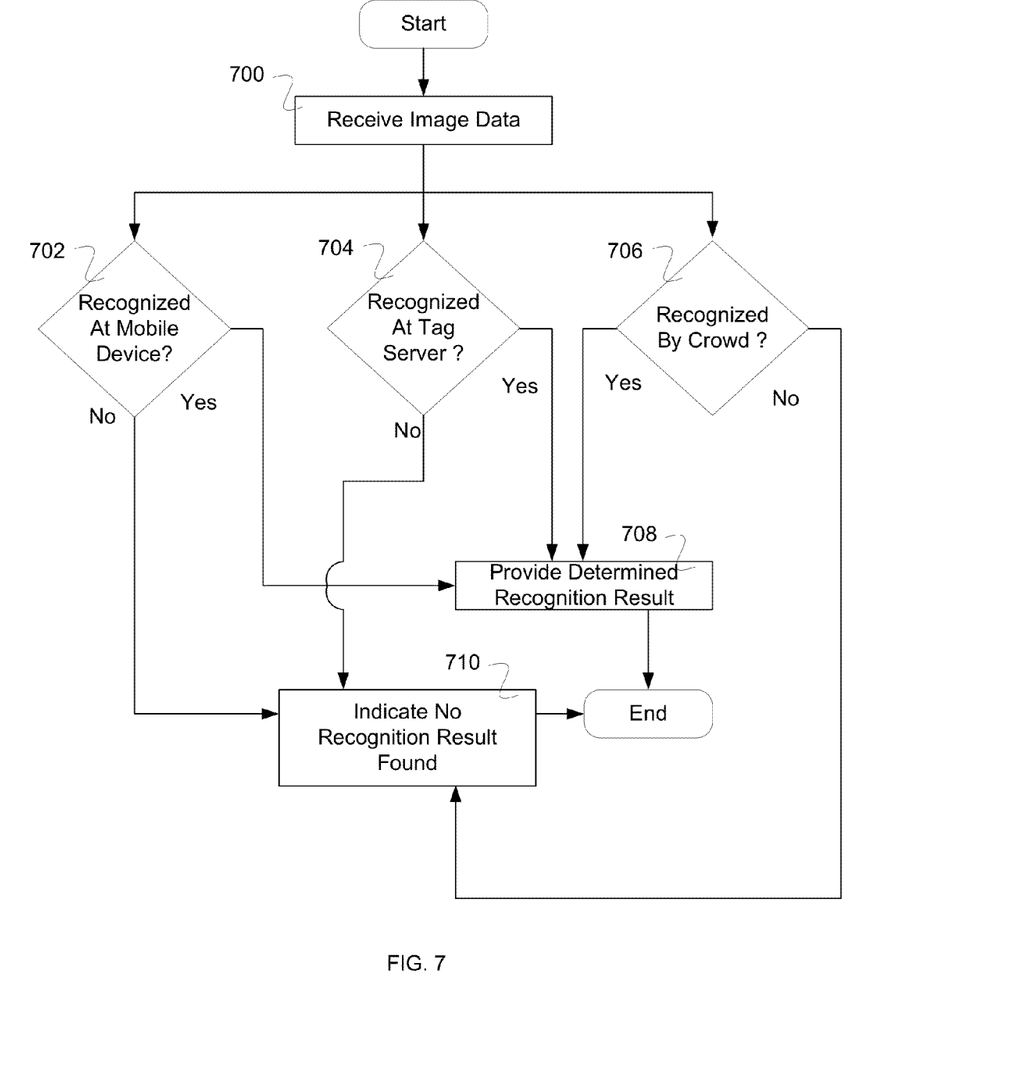
FIG. 7 is a flow diagram illustrating an embodiment of a process for identifying a tag in parallel.

FIG. 7 is a flow diagram illustrating an embodiment of a process for identifying a tag in parallel. In some embodiments, the process of FIG. 6 is used to implement 507 of FIG. 5. In the example shown, in 700 an image data is received. For example, a still image or a portion of a video stream is received at a processor for tag recognition. In some embodiments, the image is sent from a mobile device imaging device to a processor of the mobile device and the processor of a tag server. In 702, it is determined whether the image data is recognized at a mobile device. In the event that image data is recognized, control passes to 708. In the event that image data is not recognized control passes to 710. In 704, it is determined whether the image data is recognized at a tag server. In the event that image data is recognized, control passes to 708. In the event that image data is not recognized control passes to 710. In 706, it is determined whether the image data is recognized by the crowd. In the event that image data is recognized, control passes to 708. In the event that image data is not recognized, control passes to 710. In 708, the determined recognition result is provided. In 710, it is indicated that no recognition result was found.

Figure 8:
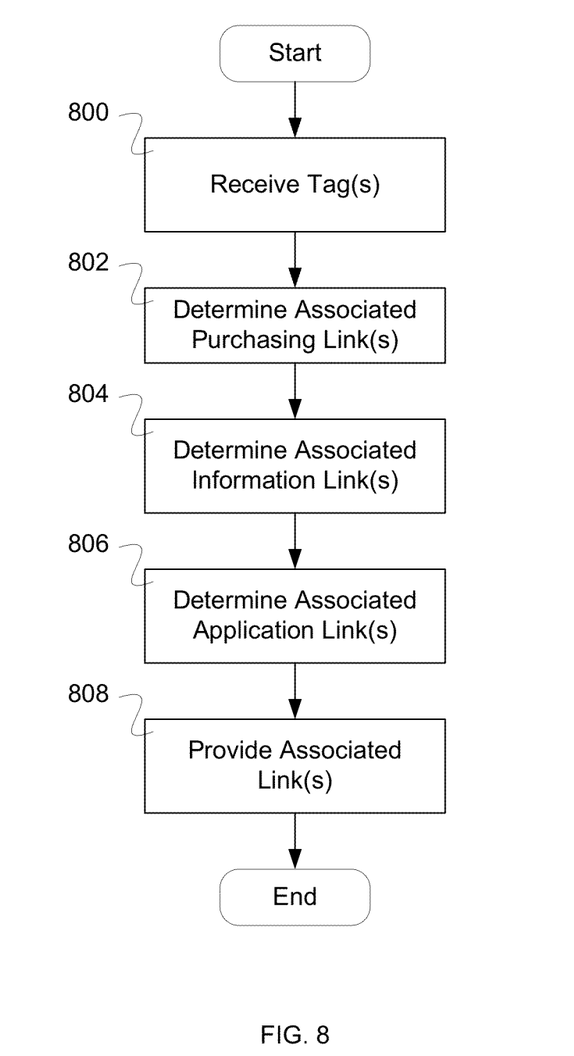
FIG. 8 is a flow diagram illustrating an embodiment of a process for determining links.

FIG. 8 is a flow diagram illustrating an embodiment of a process for determining links. In some embodiments, the process of FIG. 8 is used to implement 512 of FIG. 5. In the example shown, in 800 tag(s) is/are received. In 802, associated purchasing link(s) is/are determined. For example, a pointer to a specific location (e.g., a web page) is determined where an item associated with the tag can be purchased. In 804, associated information link(s) is/are determined. For example, a pointer to a specific location (e.g., a web page) is determined where information associated with the tag can be located. In 806, associated application link(s) is/are determined. For example, a pointer to a specific location (e.g., a web page) is determined where an application or 'APP' associated with the tag can be purchased and/or downloaded. In 808, associated link(s) are provided.

Figure 9:
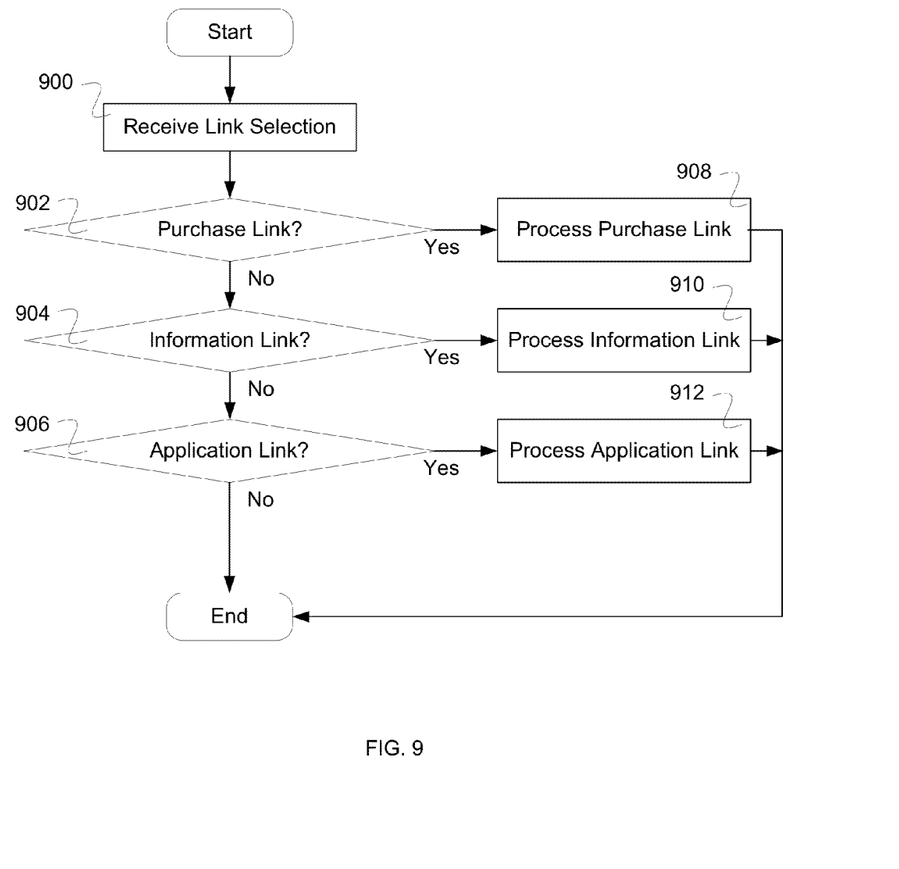
FIG. 9 is a flow diagram illustrating an embodiment of a process for causing action associated with a link.

FIG. 9 is a flow diagram illustrating an embodiment of a process for causing action associated with a link. In some embodiments, the process of FIG. 9 is used to implement 518 of FIG. 5. In the example shown, in 900 a link selection is received. In 902, it is determined whether the link is a purchase link. In the event that it is a purchase link, the purchase link is processed in 908. For example, an application is launched (e.g., a web browser) and the application is directed to a location where an item associated with a tag is available for purchase. In some embodiments, additional information is provided to purchase the item for the user including providing payment and shipping information (e.g., credit card number, code, expiration date, billing address, shipping address, etc.). In various embodiments, the additional information is stored in the mobile device or in an associated database on the mobile device or a server or any other appropriate storage location. In the event that it is not a purchase link, in 904 it is determined whether the link is an information link. In the event that it is an information link, the information link is processed in 910. For example, an application is launched (e.g., a web browser) and the application is directed to a location where information associated with a tag is available for downloading or viewing. In the event that it is not an information link, in 906 it is determined whether the link is an application link. In the event that it is an application link, the application link is processed in 912. For example, an application is launched (e.g., a web browser) and the application is directed to a location where the application associated with a tag is available for purchase and/or downloading. In some embodiments, additional information is provided to purchase an application for the user including providing payment (e.g., credit card number, code, expiration date, billing address, etc.). In various embodiments, the additional information is stored in the mobile device or in an associated database on the mobile device or a server or any other appropriate storage location. In the event that it is not an application link, the process ends. After processing the purchase link, information link or application link in 908, 910, and 912, respectively, the process ends.

Figure 10A:
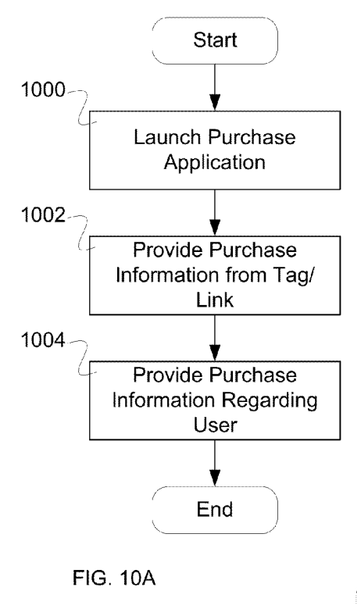
FIG. 10A is a flow diagram illustrating an embodiment of process for processing a purchase link.

FIG. 10A is a flow diagram illustrating an embodiment of process for processing a purchase link. In some embodiments, the process of FIG. 10A is used to implement 908 of FIG. 9. In the example shown, in 1000 the purchase application is launched. For example, a web browser is launched. In 1002, purchase information is provided from tag/link. For example, the browser is pointed to a web page where an item can be purchased. In 1004, purchase information regarding the user is provided. For example, user payment information (e.g., credit card, address, expiration date, security code, etc.).

Figure 10B:
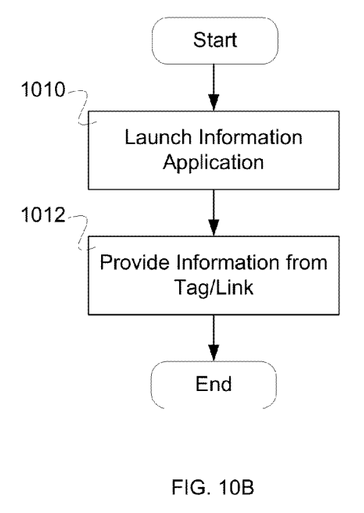
FIG. 10B is a flow diagram illustrating an embodiment of a process for processing an information link.

FIG. 10B is a flow diagram illustrating an embodiment of a process for processing an information link. In some embodiments, the process of FIG. 10B is used to implement 910 of FIG. 9. In the example shown, in 1010 the information application is launched. For example, a web browser is launched. In 1012, purchase information is provided from tag/link. For example, the browser is pointed to a web page where the information item can be retrieved.

Figure 10C:
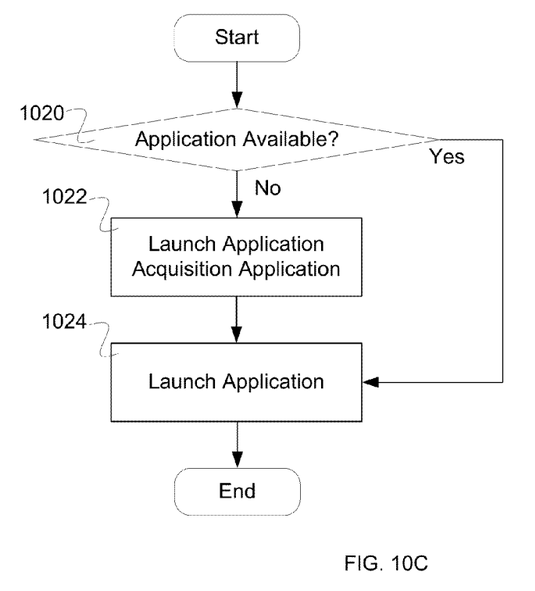
FIG. 10C is a flow diagram illustrating an embodiment of a process for processing an application link.

FIG. 10C is a flow diagram illustrating an embodiment of a process for processing an application link. In some embodiments, the process of FIG. 10C is used to implement 912 of FIG. 9. In the example shown, in 1020 it is determined whether the application is available. In the event that the application is available to run, in 1024 the application is launched. In the event that the application is not available, in 1022 the application acquisition application is launched. For example, a web browser is pointed to a web page as indicated by the link information, where the web page enables the downloading of the designated application or 'APP.'

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory, at least one of the processor or the memory being configured to:
determine one or more tags for at least one item in an image;
determine, using stored associations between links and tags, one or more links associated with the one or more tags, wherein each of the links is associated with an internet address; and
cause, via a web browser, an action associated with a selected link of the one or more links using the internet address associated with the selected link; and
a memory coupled to the processor and configured to provide the processor with instructions.

2. A system as in claim 1, wherein the image is received from an image device of a mobile device.

3. A system as in claim 2, wherein the mobile device comprises a smart phone, tablet computer, or laptop computer.

4. A system as in claim 1, wherein the image is acquired based on a user trigger.

5. A system as in claim 1, wherein the image is acquired based on a motion sensor or motion sensing algorithm.

6. A system as in claim 1, wherein the one or more tags are identified, at least in part, using image processing to identify the item in the image.

7. A system as in claim 6, wherein the image processing is performed by a processor of a mobile device.

8. A system as in claim 6, wherein the image processing is performed by a processor of a tag server.

9. A system as in claim 1, wherein the one or more tags are identified using a crowd source.

10. A system as in claim 1, wherein the selected link is selected by a user as input on a mobile device.

11. A system as in claim 1, wherein the selected link is selected by a user selecting a link from a list or menu.

12. A system as in claim 1, wherein the selected link is selected by a user selecting an icon.

13. A system as in claim 1, wherein the image is a single image.

14. A system as in claim 1, wherein the image is from a video stream.

15. A system as in claim 1, wherein the selected link comprises a purchase link for purchasing the item.

16. A system as in claim 15, wherein the purchase link is used in conjunction with user information to purchase the item.

17. A system as in claim 1, wherein the selected link comprises an information link, wherein causing an action associated with the selected link includes downloading or presenting information obtained via the information link.

18. A system as in claim 1, wherein the selected link comprises an application link via which an application is available for purchase or downloading.

19. A system as in claim 1, at least one of the processor or the memory being configured to perform operations, further comprising:
provide information pertaining to the one or more links associated with the one or more tags; and
obtain an indication of a selection of one of the links.

20. A system as in claim 1, at least one of the processor or the memory being configured to perform operations, further comprising:
associate the one or more tags with the image or the item.

21. A system as in claim 1, further comprising:
launching an application associated with the selected link.

22. A system as in claim 21, further comprising:
launching an application, wherein the internet address associated with the selected link is provided to the application.

23. A system as in claim 1, wherein each of the tags is a text tag.

24. A method of link acquisition and usage using image recognition, comprising:
receiving, using an interface, an image;
determining, using a processor, one or more tags for at least one item in the image;
determining, using stored associations between links and tags, one or more links associated with the one or more tags, wherein each of the links is associated with an internet address; and
causing, via a web browser, an action associated with a selected link of the one or more links using the internet address associated with the selected link.

25. The method as in claim 24, at least one of the processor or the memory being configured to perform operations, further comprising:
determine the one or more tags associated with the item from a source external to the image.

26. A method as in claim 24, wherein determining one or more tags for at least one item in the image comprises obtaining the one or more tags via a computer vision process or a crowd source process.

27. A method as in claim 24, wherein image does not include the one or more tags.

28. A method as in claim 24, wherein the action is performed automatically.

29. A method as in claim 24, further comprising:
automatically retrieving one or more items from a database;
wherein the action is performed using the retrieved items.

30. A computer program product for link acquisition and usage using image recognition, the computer program product being embodied in a tangible computer readable storage medium and comprising computer instructions for:
receiving an image;
determining one or more tags for at least one item in the image;
determining, using stored associations between links and tags, one or more links associated with the one or more tags, wherein each of the links is associated with an internet address; and
causing, via a web browser, an action associated with a selected link of the one or more links using the internet address associated with the selected link.

* * * * *